A. M. WALSTROM.
STARTING DEVICE FOR AUTOMOBILE ENGINES.
APPLICATION FILED JAN. 6, 1910.

958,985.

Patented May 24, 1910.
3 SHEETS—SHEET 1.

WITNESSES
INVENTOR
Axel M. Walstrom

A. M. WALSTROM.
STARTING DEVICE FOR AUTOMOBILE ENGINES.
APPLICATION FILED JAN. 6, 1910.

958,985.

Patented May 24, 1910.

3 SHEETS—SHEET 2.

WITNESSES
J. E. Sorensen
L. C. Cronen

INVENTOR
Axel M. Walstrom

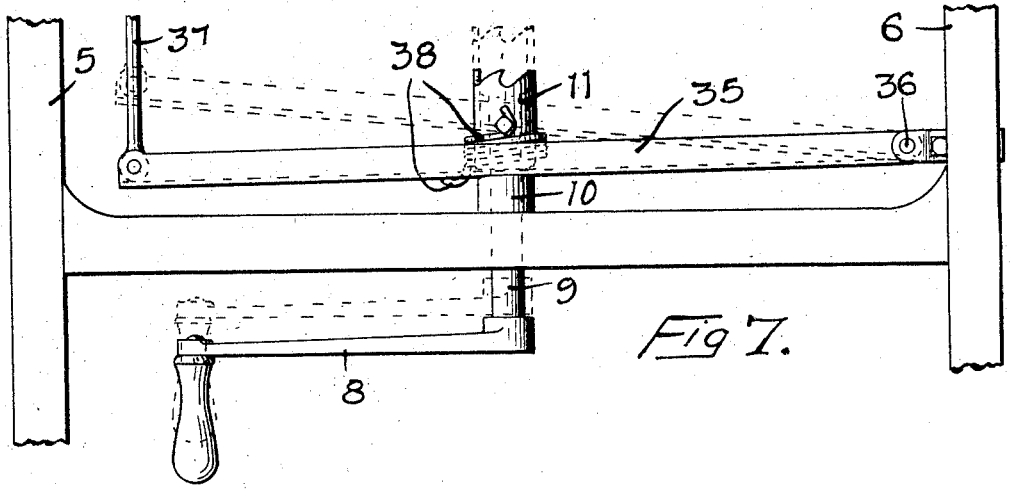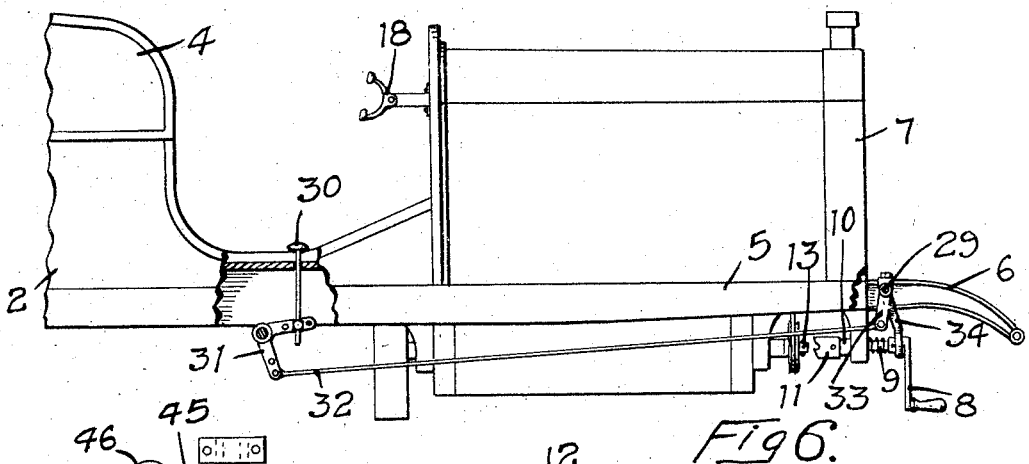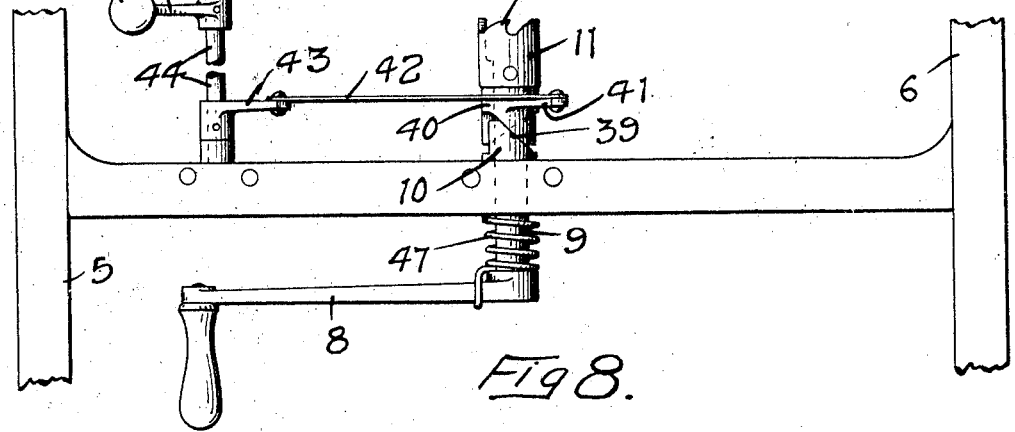

UNITED STATES PATENT OFFICE.

AXEL M. WALSTROM, OF MINNEAPOLIS, MINNESOTA.

STARTING DEVICE FOR AUTOMOBILE-ENGINES.

958,985.  Specification of Letters Patent.  Patented May 24, 1910.

Application filed January 6, 1910. Serial No. 536,649.

*To all whom it may concern:*

Be it known that I, AXEL M. WALSTROM, of Minneapolis, Hennepin county, Minnesota, have invented certain new and useful Improvements in Starting Devices for Automobile-Engines, of which the following is a specification.

My invention relates to the type of automobiles having a non-detachable starting crank in the front end thereof, and the object of my invention is to provide means whereby said starting crank may be operated from the driver's seat, thereby making it unnecessary for the driver to walk around to the front of the automobile to start the engine.

My invention consists of flexible means connecting the crank with a handle conveniently located within reach of the driver, and automatic means for shifting the crank into and out of engagement with the engine crank shaft.

My invention consists, further, of providing an anti-friction pulley on the front end of the automobile over which said flexible connection passes and thereby transmitting the longitudinal movement of the operating handle into a transverse movement of the starting crank.

Further, my invention consists of means whereby the shifting of the starting crank may be accomplished by actuating a foot pedal near the driver's seat.

Further my invention consists of various features and combinations as hereinafter described and pointed out in the claims.

Figure 1:
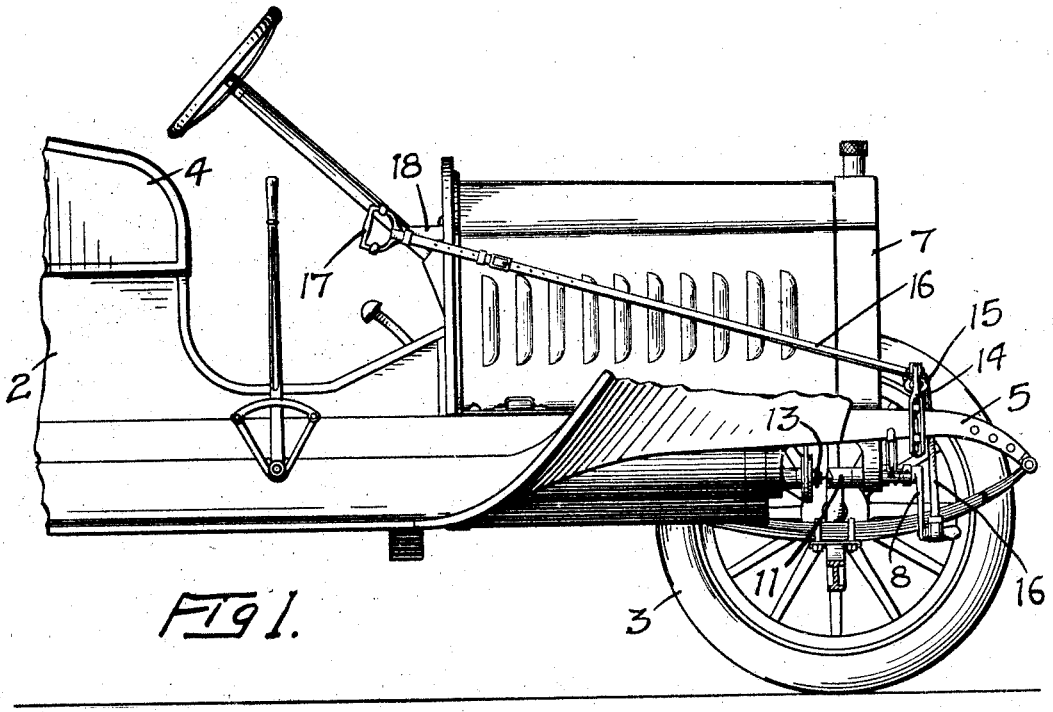
Figure 2:
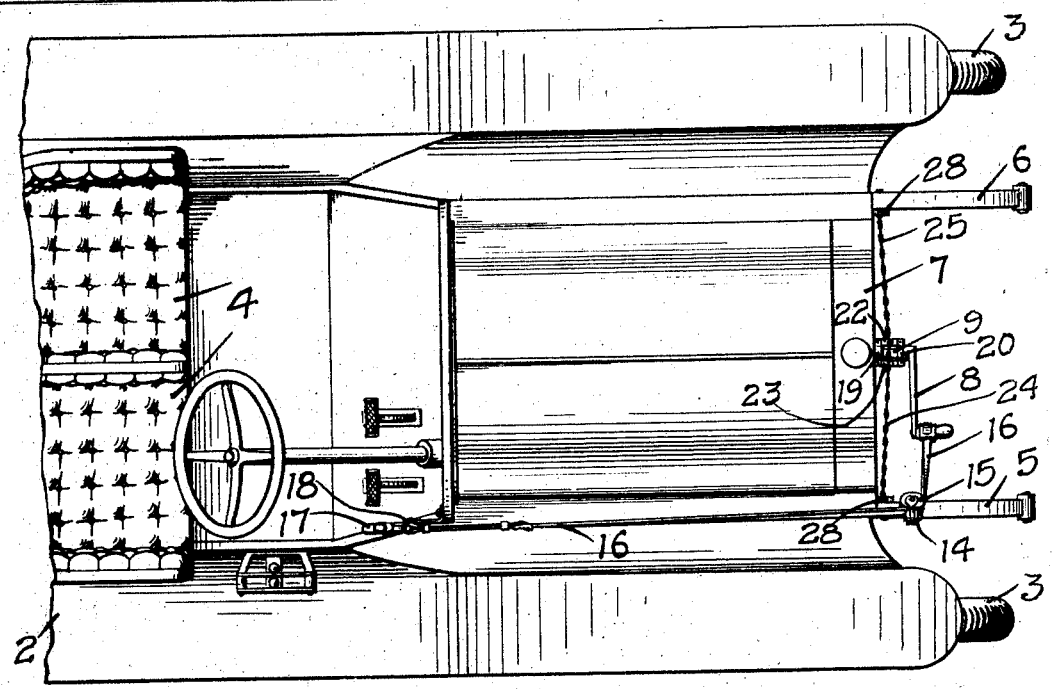
Figure 3:
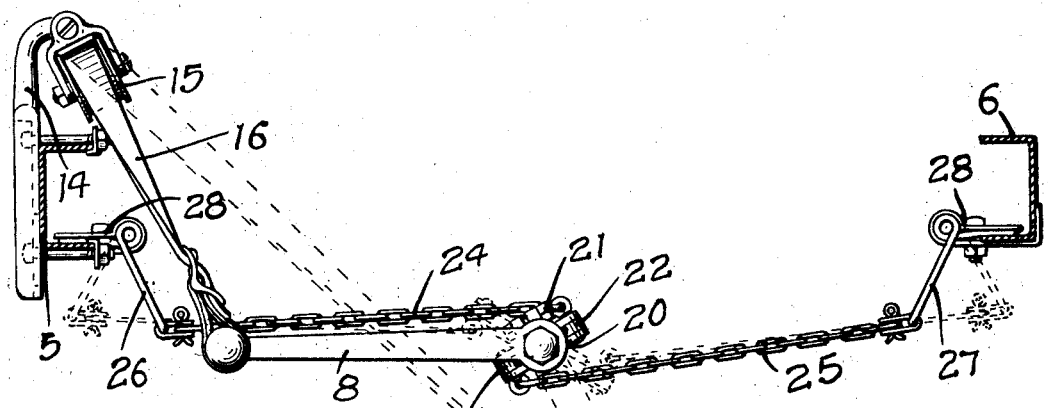
Figure 4:
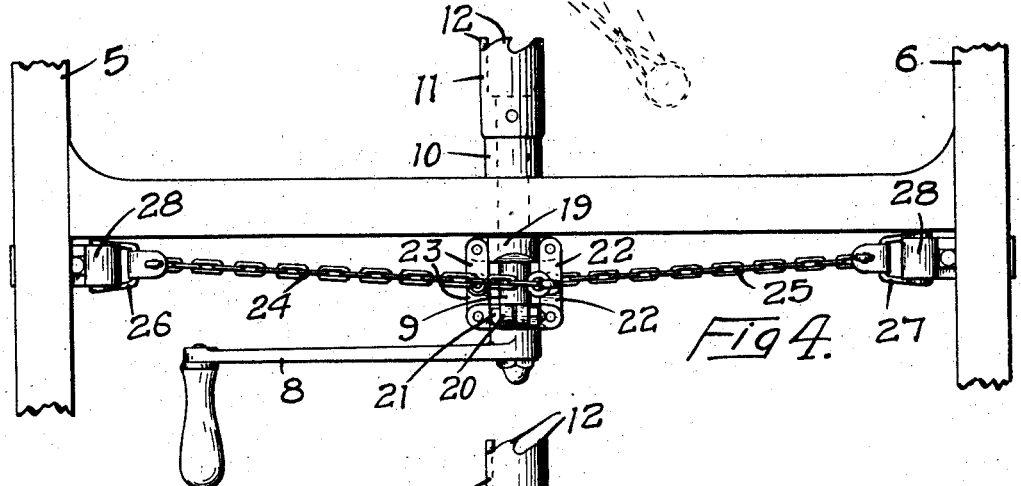
Figure 5:
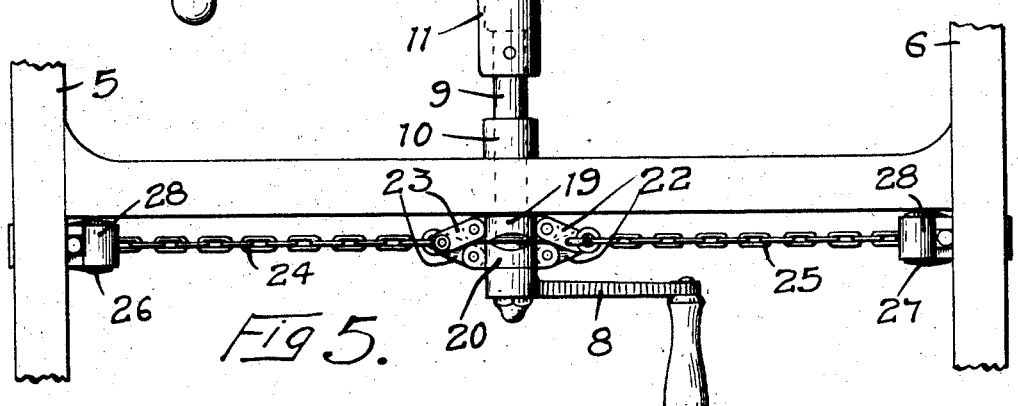

In the accompanying drawings, forming part of this specification, Figure 1 is a side view of the forward portion of an automobile with one wheel and part of the fender broken away to more clearly illustrate my invention as applied thereto. Fig. 2 is a plan view of the same. Fig. 3 is a front view of the starting device. Fig. 4 is a plan view of the automatic shifting device, showing the "disengaged" position. Fig. 5 is a similar view showing the "engaged" position. Fig. 6 is a side view of a crank shifting device operated by a foot-pedal. Fig. 7 is a plan view, showing a modification of the device illustrated in Fig. 6. Fig. 8 is a plan view of another modification.

In the drawings, 2 represents an automobile having front wheels 3 and a seat 4.

5 and 6 are the longitudinal frame members usually of a channel section as shown in Fig. 3, and extending forward beyond the radiator 7. At the lower edge of the radiator the starting crank 8 is mounted on a short shaft 9 that is slidable in a bearing 10 and provided at its inner end with a sleeve 11 having teeth 12 to engage similar teeth or projections on the engine crank shaft 13. This is the most usual construction and I make no claim to the same herein.

On the forward end of the frame member 5 I provide a bracket 14 carrying an anti-friction wheel or pulley 15. A flexible connection 16, preferably a leather strap, passes over the wheel 15 and has one end removably attached to the handle of the crank 8 and is provided at its other end with a grip or handle 17 which is normally supported, within convenient reach of the driver, on a bracket 18 that is preferably secured to the dashboard but may be secured to the footboard or side of the car.

For the purpose of automatically moving the shaft 9 with its toothed sleeve 11 into engagement with the engine crank shaft I provide the following mechanism. On the shaft 9 I provide collars 19 and 20, the former slidable thereon and the latter secured thereto by a clamping bolt 21. Toggle-joints composed of links 22 and 23 connect the collars 19 and 20, and flexible connections 24 and 25 are attached to the middle joints of the toggles 22 and 23 respectively, and to springs 26 and 27 that are secured to the frame members 5 and 6 by clips 28. The connections 24 and 25 are attached to the links 22 and 23 on opposite sides of the center of the shaft 9, so that the tension of the springs 26 and 27 tends to revolve the shaft 9 in a direction opposite to that of the engine crank shaft. The normal or inoperative position of the crank and toggle-joints is shown in full lines in Figs. 3 and 4, with the toggle-joints extended and the teeth 12 drawn out of contact with the engine crank shaft.

The driver, wishing to start the engine without leaving his seat, grasps the handle 17 and releasing it from the bracket 18, allows the springs 26 and 27 to revolve the crank until it reaches the position indicated by dotted lines in Fig. 3, at which point the toggle-joints will be broken and thereby drawing the collars 19 and 20 together (see Fig. 5) and sliding the shaft 9 in its bearing until the toothed sleeve 11 engages the engine crank shaft. Now, the driver will pull on the handle 17 and thereby start the engine, and as the crank reaches the point shown by full lines in Fig. 3, the toggle-joints will again be extended and the crank resume its inoperative position. If the engine fails to start with the first effort, the operation may be repeated until it does.

In some cases it may be desirable to shift the crank by a suitable mechanism operated from the driver's seat by a foot-pedal or lever. This can be accomplished in many different ways, but preferably by the mechanisms I am about to describe.

As shown in Fig. 6, I mount a rock shaft 29 across the front of the automobile, which is adapted to be rocked by a foot pedal 30 on a bell crank 31 having a connection 32 with a depending arm 33 on the rock shaft. Another arm 34 also depends from said rock shaft and engages the crank and moves it into engagement with the engine crank shaft when the pedal 30 is depressed.

As shown in Fig. 7 one end of a bar 35 is pivoted at 36 on the frame member 6 and its opposite end is provided with an operating rod 37. The shaft 9 passes through said bar and is connected thereto by the sleeve 11 and a spring 38 which is adapted to return the crank to its starting point.

In Fig. 8 I have shown the bearing 10 provided with cam surfaces 39 adapted to coöperate with similar surfaces on a sleeve 40. The sleeve 40 is provided with an arm 41 having a connection 42 with an arm 43 mounted on a rock shaft 44 which is provided with another arm 45 having an operating pedal 46, which, when depressed, will rock the shaft 44 and revolve the sleeve 40 and cause the cam surfaces to engage and move the sleeve 11 into engagement with the engine crank shaft. A spring 47 serves the double purpose of disengaging the crank and returning it to its starting point.

The various details, as herein described, may be modified in many ways without departing from the principle of my invention, and I do not wish to be confined to the same as shown.

I claim as my invention:

1. In a starting device for automobile engines, the combination of an automobile having an explosive engine and a starting crank therefor, of a pulley provided near said crank, a flexible connection coöperating with said pulley and having one end attached to the handle of said crank and its other end provided with a handle detachably supported on a suitable bracket near the seat of said automobile.

2. In a starting device for automobile engines, the combination of an automobile having an explosive engine and a starting crank therefor, of a pulley provided near said crank, flexible means coöperating with said pulley and having one end attached to the handle of said crank and its other end detachably supported near the seat of said automobile and provided with a suitable handle, means for returning said crank to its starting point.

3. In a starting device for automobile engines, the combination of an automobile having an explosive engine and a starting crank therefor, of a pulley provided near said crank, flexible means coöperating with said pulley and having one end attached to the handle of said crank and its other end provided with a handle detachably supported near the seat of said automobile, means for returning said crank to its starting point, and means for connecting and disconnecting said engine and crank.

4. In a starting device for automobile engines, the combination of an automobile having an explosive engine and a starting crank therefor, of a pulley provided near said crank, flexible means coöperating with said pulley and having one end attached to said crank and its other end extending to a point near the seat of said automobile and provided with a suitable handle, means for returning said crank to its starting point, and automatic means for connecting and disconnecting said engine and crank.

5. In a starting device for automobile engines, the combination of an automobile having an explosive engine and a starting crank therefor, of a flexible means connecting said starting crank with a handle located near the seat of said automobile, automatic means for connecting and disconnecting said engine and crank and consisting of toggle-joints connecting said crank to a sliding collar thereon, means connecting the middle joint of said toggles to springs provided on said automobile, and said toggle-joints adapted to be alternately extended and collapsed at predetermined points in the revolution of said crank for the purpose mentioned.

In witness whereof, I have hereunto set my hand this 3d day of January 1910.

AXEL M. WALSTROM.

Witnesses:
G. E. SORENSEN,
L. C. CRONEN.